United States Patent [19]

Haberthier

[11] 4,111,183
[45] Sep. 5, 1978

[54] SOLAR HEATING UNIT

[76] Inventor: Wilbert L. Haberthier, 660 G Ave., Limon, Colo. 80828

[21] Appl. No.: 701,535

[22] Filed: Jul. 1, 1976

[51] Int. Cl.² .................................................. F24J 3/02
[52] U.S. Cl. .................................................. 126/270
[58] Field of Search ............... 126/270, 271; 237/1 A; 98/88 R, 96, 107, 114

[56] References Cited

U.S. PATENT DOCUMENTS

| 246,626 | 9/1881 | Morse | 126/270 |
|---|---|---|---|
| 1,467,005 | 9/1923 | Lawrence | 237/1 A X |
| 2,425,797 | 8/1947 | Gillespie | 237/1 A |
| 2,529,621 | 11/1950 | Mayo | 237/1 A |
| 2,671,441 | 3/1954 | Harris | 126/270 |
| 2,680,437 | 6/1954 | Miller | 126/270 |
| 2,931,578 | 4/1960 | Thompson | 126/270 X |
| 3,863,621 | 2/1975 | Schoenfelder | 237/1 A X |
| 3,960,135 | 6/1976 | Angilletta | 237/1 A X |
| 3,971,359 | 7/1976 | Bourne | 126/270 |

Primary Examiner—William F. O'Dea
Assistant Examiner—Larry Jones
Attorney, Agent, or Firm—Richard W. Hanes

[57] ABSTRACT

A solar heat unit which channelizes the flow of air through inclined tubular openings disposed in the nature of louvers and where the bottom surface of the "louver" slats is utilized to reflect the rays of the sun to a heat absorbing panel disposed on the high side of the louver openings and in the path of air flowing through the openings so as to transfer the heat energy from the heat absorbing panel to the air.

2 Claims, 3 Drawing Figures

SOLAR HEATING UNIT

The present invention relates to apparatus for solar heating of convective air. More specifically, the device consists of an improvement to a louvered opening in a building or wall structure which has for its primary object the heating and channelizing of the air moving through inclined passages between the louver vanes.

Another object of the invention is to provide a device which functions on the louver principle and can thereby provide heat energy to a heat absorbing panel which does not have to be in a position to receive incident radiation.

Other objects of the invention will become apparent upon reading the following detailed description of a preferred form of the invention taken in connection with the accompanying drawings in which.

Figure 1:
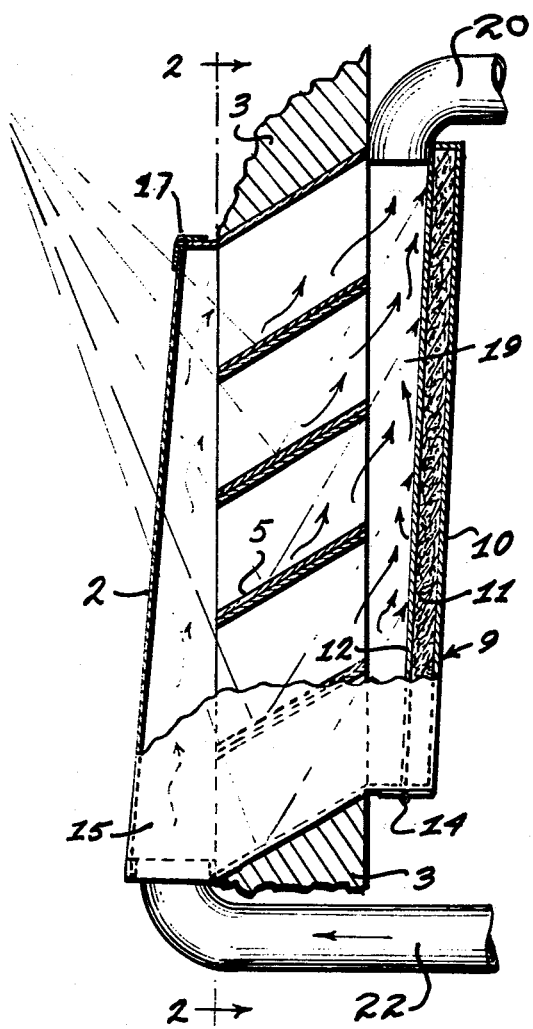
FIG. 1 is a cross-sectional view of the solar heating unit of the present invention shown as it would be installed in an opening of a building wall.
Figure 3:
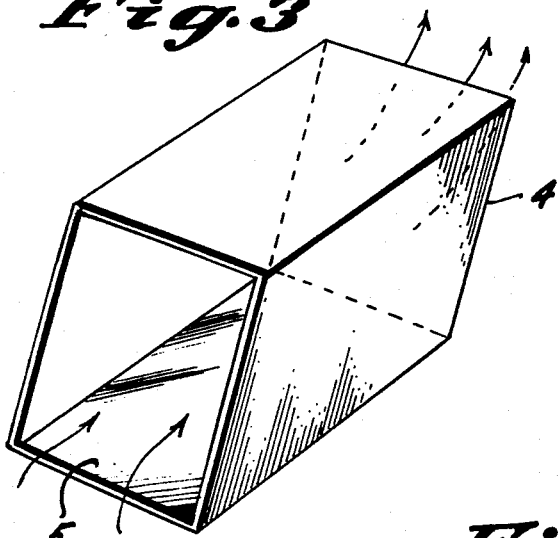
FIG. 3 is an enlarged perspective view of one of the louver tubes of the solar heating unit.
Figure 2:
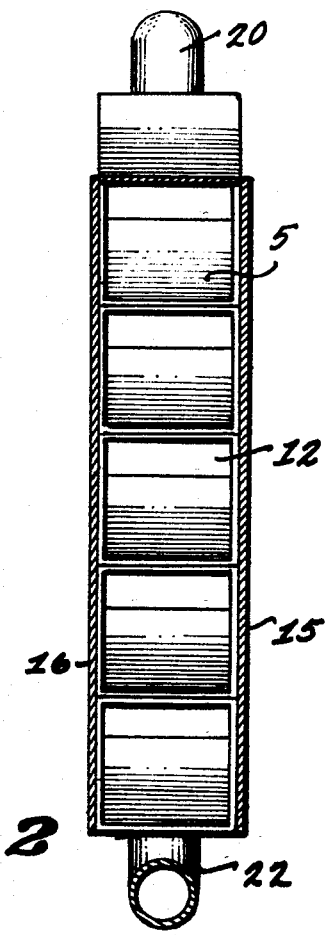
FIG. 2 is an elevational view of the solar heating unit taken along lines 2—2 of FIG. 1.

Referring first to FIG. 1, a preferred form of the system is shown as it might appear installed in an opening of a building wall, such as a window. When installed in such an opening, the viewing function is lost from the inside, however, the outside appearance is that of a glass window, transparent panel 2 serving that function.

Inasmuch as the object of the invention is to channelize the air flow through the heating device, the louvered openings are constructed from a series of stacked rectangularly shaped tubes 4, the two ends of which may define parallel planes which are not at right angles to the longitudinal axis of the tube. The tubes 4 are disposed within the wall of the building 3 in an inclined position so that the exterior opening is lower than the opening which is proximal to the building interior. The plane defined by the ends of the tubes 4 is preferably disposed in a vertical or plumb position, parallel to the plane of the building wall into which the unit is mounted.

The angular relation between the plane of each of the exterior tubular openings and the bottom surface of each tube provides the sun's rays with access to the bottom surface 5 of each tube 4. As shown in FIG. 1, the sun's rays are reflected from the inside bottom surface of the tubes 4 to a heat absorbing panel 9 disposed vertically along the back side of the louver stack.

The panel 9 comprises a rigid frame 10 with interior insulation 11 and a black, highly heat absorbant and non-reflective surface material 12 mounted on the frame and facing the stack louver tubes 4. The panel 9 is pivotally mounted behind the louver stack by means of a hinge 14 in order that the size of the air conduit formed by the panel on the one side and the louvers on the other, together with appropriate side walls 15 and 16, may be varied to accommodate different volumes of air.

A similar air flow adjustment is provided on the front or air-entry side of the louvers by means of a hinge 17 which pivotally attaches the transparent panel 2 to the top end of the louver stack. The panel 2, together with appropriate side walls 15 and 16, define a conduit or passage for air entering the lower side of the louver tubes 4.

The plenum 19 formed by the heat absorbing panel 9 and its side walls 15 and 16 is connected to an appropriate conduit or piping 20 to carry the heated air to a storage or heat transfer device or directly to a heating use.

Cool air, from which the heat has already been removed, is conveyed through a conduit 22 to re-enter the solar heating unit at the lower portion of the air space defined in part by the transparent shield 2.

The heat energy transferred to the air in the plenum from the heat absorbing material on the back panel 9 is sufficient in most cases to create the necessary air circulation for the system, however, a normal blower or fan (not shown) could be used if it is necessary to enhance the circulation.

It will be seen from the description of the solar heat unit that within a wide range the angle of the sun's rays do not materially effect the reflection from the bottom surface of the tubes 4 nor does the angle materially effect the heat which can be absorbed by the panel 9. The use of a highly reflective coating on the inside bottom surface 5 of each of the tubes 4 advantageously effects the amount of heat energy which can be absorbed by the panel 9.

The heating unit can be expanded and enlarged by uniting contiguous stacks of louver tubes in side-by-side relation.

I claim:

1. A solar heating unit comprising:
   a plurality of vertically stacked tubes, each having rectangular cross section and having sides defining a parallelogram in which one corner angle is less than 90° and having a heat reflective inside bottom surface, and wherein one end of each tube is disposed at a lower level than the other end;
   an entry air chamber enclosing the said lower ends of the said tubes having transparent wall means and;
   a heated air plenum enclosing the elevated ends of the tubes and comprising a heat absorbing non-reflective wall.

2. The combination of claim 1 wherein at least one of the wall means is movably disposed to enlarge or contract the volume of the air chamber.

* * * * *